May 22, 1945. J. M. WALKER, JR 2,376,739
FILTER
Filed Aug. 4, 1942
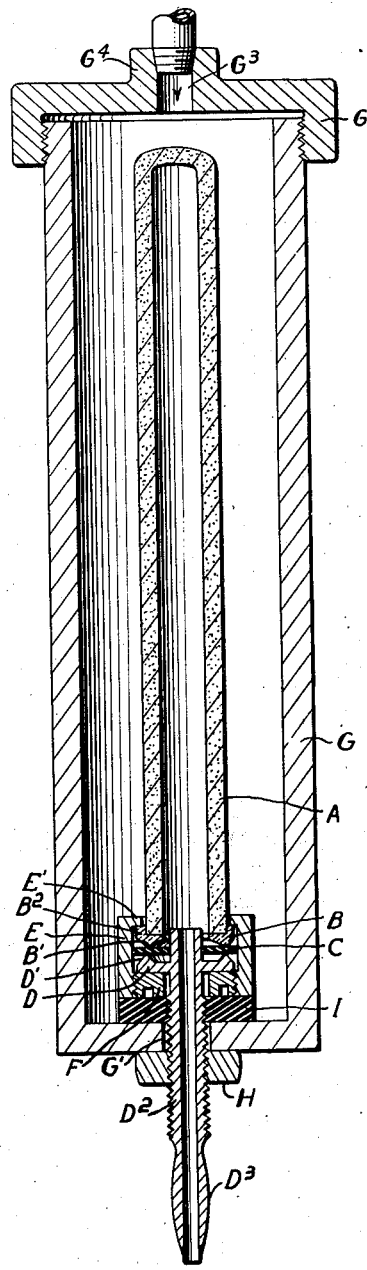
INVENTOR
JOHN M. WALKER, JR.
BY
John E. Hubbell
ATTORNEY

UNITED STATES PATENT OFFICE 2,376,739

FILTER

John M. Walker, Jr., Philadelphia, Pa., assignor to Selas Corporation of America, a corporation of Pennsylvania Application August 4, 1942, Serial No. 453,565

2 Claims. (Cl. 210—112)

The general object of the present invention is to provide an improved filter of the type commonly referred to as a filter cylinder, or candle, and comprising a hollow filter body of porous ceramic material which usually is porcelain. Such filter cylinders or candles are effective and relatively inexpensive, and have long been in extensive use, but as heretofore constructed, they have comprised end connections which are permanently attached to the filter bodies and have some objectionable characteristic. Such end connections are needed to permit the filter to be connected to conduits and to be mounted in filtering vessels as is necessary in many cases.

More specifically stated, the object of the present invention is to provide a filter cylinder or candle comprising a hollow porous ceramic body, a separable metallic end piece and simple and effective means for detachably connecting said body and end piece, and thereby avoiding difficulties heretofore experienced with filters having permanently connected end pieces.

Heretofore two types of end connections for such filters have been in general use. In one type the end connection is a porcelain head or nipple which is integral with, or more usually, is cement or glaze connected to the filter body, and which differs from the latter in that it is substantially impervious as a result of a glaze coating or because of its dense character. While a filter candle having a nipple permanently attached to its end is suitable for vacuum filtration under conditions in which it is practically feasible to insert the nipple in the end of a rubber tube, filters with permanently attached porcelain end connections are not well adapted for mounting in pressure vessels and are not suitable for large scale commercial use, particularly when as is common in commercial filtration, the liquid filtered is under a pressure of the order of 100 pounds per square inch.

The second type of filter end connection, which is that customarily used for pressure filtration and in filter vessels, comprises a metal cap or head which is formed with a central passage surrounded by a tubular boss and is connected to the end of the tubular filter body. Filters comprising such metallic end connections may be readily mounted in pressure vessels and seldom fail as a result of the liquid pressures impressed on them in ordinary pressure filtration work. Such filters frequently do fail, however, as a result of the thermal expansion stresses to which they are subjected when sterilized, and in bacteriological filtration such filters are customarily sterilized immediately prior to each period of use, by placing them in an autoclave containing steam at about 15 pounds pressure.

In the course of such sterilization, the differences between the thermal expansion coefficients of the metal end piece, the ceramic filter body and the Portland or other cement, employed to connect the end piece and body of the filter together, cause the filter to break apart in some cases, and in other cases produce cracks which may or may not be visible and in either event permit leakage which is highly objectionable in bacteriological filtration. The formation of invisible leakage producing cracks is especially objectionable because filters cannot be subjected to ordinary leakage tests after steam sterilization and prior to their use in bacteriological filtration, without risk of bacterial contamination.

The use of metallic end connections permanently attached to ceramic filter bodies precludes the use of certain filter body cleaning operations which are desirable under certain conditions. One such operation thus precluded involves the saturation of the filter body with a chemical cleaning fluid which does not attack porcelain, at least to a significant extent, but which will corrode metal with which it comes into contact. A second well known filter cleaning method which cannot be used to clean ceramic filter bodies having a permanently attached metallic end piece, involves heating the filter body to a red heat to burn out organic matter deposited in the pores of the filter body. Such organic deposits, which clog and reduce the filtering capacity of the filter, may result from steam sterilization which kills bacteria in, but does not remove them from, the filter body pores. Such deposits may also consist of fine particles carried into, but not through the filter body by the liquid filtered, and in particular, may consist of fine activated carbon particles added to the liquid piror to its filtration, to act as a color adsorbent.

In a filter made in accordance with the present invention with separable ceramic filter body and metallic end member parts, the filter body may be readily separated from the end member whenever it becomes desirable to burn out organic material deposited in its pores, or to treat the body with a cleansing chemical which will corrode metal with which it comes in contact. Furthermore, in the preferred form of the invention hereinafter described in detail, the mechanical connection between the separable porous body and metallic end member includes a gasket of yielding material which is interposed between body and end member engaging portions so shaped that an adequately tight joint can be maintained without subjecting the porous body to objectionable stresses or to appreciable risk of cracking when assembling the filter structure or in subjecting it to steam sterilization.

The metallic end pieces employed in accordance with the present invention are practically indestructible under normal operating conditions and can be used successively with porous bodies replaced as their deterioration in use may make desirable, or to permit the successive use of different filter bodies with a single end piece in filtering operations requiring different filter body porosities or dimensions.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention, in which the single figure is an elevation in section of a filter vessel with a desirable form of filter candle constructed and mounted in the vessel in accordance with the present invention.

The desirable form of embodiment of the present invention illustrated in the drawing, comprises a porous ceramic filter body A ordinarily formed of porcelain, and conventionally shaped as a tube, open at one end and closed at the other. Attached to the tube A at its open end is an annular body B of dense impervious porcelain which is coaxial with and somewhat larger in external diameter than the tube A, and which is customarily attached to the tube by a firing operation in which the parts are fused or glazed to one another.

At its side facing away from the tube A, the part B is formed with a circular rib or knife edge B'. In the assembled filter construction, a yielding gasket C, which may be formed of semi-hard rubber or other suitable material, is engaged by and compressed between the circular knife edge B' and an opposing circular knife edge D' formed on the adjacent side of the disc like body of a metallic end piece D. The member D also comprises a tubular part $D^2$ coaxial with and integrally connected to its body and extending from each side of the latter.

As shown in the drawing, the parts A and D are mechanically connected by a coupling or union E, the cylindrical body of which surrounds the gasket C and porcelain part $B^2$ and is formed at one end with an internal flange E' in abutting relation with the shoulder portion $B^2$ of the part B which surrounds the end portion of the tube A. At its opposite end, the coupling member E is internally threaded to receive an externally threaded washer member F which is in abutting relation with the disc like body portion of the member D and is formed with spanner openings for use in screwing it into and out of place.

The external end of the tubular portion $D^2$ of the end piece D is shaped to form a nipple $D^3$ which may be inserted in the end of a rubber tube to thus adapt the filter structure for vacuum filtration or other filtration operations which may be conveniently carried out without mounting the filter in a filter vessel.

In the drawing, however, the filter is shown as mounted in a filter vessel G having one end closed except for a central orifice G' through which the external end of the tubular part $D^2$ extends. As shown, the part $D^2$ is externally threaded and is surrounded by a clamping nut H by which the filter is anchored to the wall of the vessel G, and a yielding gasket I formed of rubber or the like is compressed between the end wall of the member G and the adjacent surface of the members E and F to prevent leakage through the opening G'. As shown, the vessel G has its second end closed by a threaded cap or end member $G^2$ provided with an axial passage $G^3$ and external tubular extension $G^4$ adapted to be connected to piping supplying liquid to be filtered at a suitable pressure, which in many cases may well be about 100 pounds per square inch.

The filter structure shown and described permits filter bodies differing in porosity or in length or shape to be interchangeably mounted in a single metallic end member, and permits changing a porous filter body, which has been broken or has deteriorated as a result of progressive solvation produced by chemical cleaning operations, or as a result of crystallization changes produced by repeated firing operations to burn out organic matter deposited in the pores of the filter body. The filter structure illustrated, also permits its metallic end piece to be mounted in pressure vessels and supports varying in form as conditions make desirable. The capacity for interchangeable use of filter bodies of different porosities in a single metallic end member is especially desirable in cases in which a liquid is successively passed through filters of different porosities in different stages of a single complete process. For example, in serum filtration, preliminary, intermediate and final filtrations through filter pores of successively decreasing sizes, are practically essential to first screen out a large bulk of fibers, and secondly to free the liquid from a considerable portion of an original small particle content and finally to effect a sterilizing filtration which would be objectionably slow if the bulk of fibers and small particles had not been eliminated by the preliminary and intermediate filtration steps.

The ceramic filter body may be readily disconnected from the metallic end piece whenever it becomes desirable to clean the body by the use of a cleaning chemical which would corrode the metallic end piece if allowed to come into contact with the latter, and to permit the filter body to be fired to a red heat to burn out organic matter deposited in the filter body pores.

Steam sterilization of the connected filter body and metallic end piece can be effected without serious risk of cracking the filter body as a result of relative thermal expansion of different portions of the structure, since the gasket C is adapted to yield to accommodate the unequal expansion of the parts. Furthermore, the joints formed may be made sufficiently tight to avoid leakage without risk of cracking the porcelain.

With the construction shown and described, the tightening of the joint creates no tendency whatever for angular movement of the porcelain part B relative to the member D or relative to the gasket C.

While in accordance with the provisions of the statutes, I have illustrated and described the best form of embodiment of my invention now known to me, it will be apparent to those skilled in the art that changes may be made in the form of the apparatus disclosed without departing from the spirit and scope of my invention, as set forth in the following claims.

Having now described my invention what I claim as new and desire to secure by Letters Patent, is:

1. A detachable fluid-tight connector for a filter element comprising a hollow body of porous material open at one end, said connector including an annular washer of resilient material arranged to be positioned against the open end of the element, an apertured disk adapted to be positioned against the washer, said disk having a hollow stem communicating with the aperture and projecting from a face of the disk opposite to that bearing against the washer, and detachable means including a first member coacting with the element and adapted to grip the latter at the open end thereof and a second member threadedly engaging said first member and coacting with the disk to exert force against the latter for holding the washer and disk snugly pressed against the open end of the element, said first and second members when threadedly engaged to connect said disk and washer to the open end of the element being capable of axially moving the element and washer and disk tightly together without effecting relative angular movement of the washer with respect to the disk and the open end of the element.

2. A detachable fluid-tight connector for a filter element comprising a hollow body of porous material open at one end, such open end having an outwardly extending shoulder, said connector including a hollow open-ended cap having an inwardly extending flange, said cap being adapted to fit over the element and be positioned thereon so that a part of the cap extends beyond the open end of the element and the flange overlies the shoulder, an apertured disk having a hollow stem communicating with the aperture and projecting from a face of the disk, the diameter of the disk being less than the internal diameter of the cap so that the disk may be freely inserted into and removed from the cap, the disk normally being positioned in the cap adjacent the open end of the element, a removable annular washer of resilient material within the cap between the disk and the open end of the element, and means including a turnable clamping member threadedly engaging the cap and acting against the disk to draw the flange snugly toward the shoulder and compress the washer between the disk and the open end of the element, said clamping member when threadedly connected to the cap to compress the washer between the disk and the open end of the element being capable of axially moving the element and washer and disk tightly together without effecting relative angular movement of the washer with respect to the disk and the open end of the element.

JOHN M. WALKER, Jr.